(12) United States Patent
Carlyle

(10) Patent No.: US 6,230,875 B1
(45) Date of Patent: May 15, 2001

(54) SYNCHRONIZED VIBRATOR CONVEYOR

(76) Inventor: Allan M. Carlyle, 5587 Heather Street, Vancouver, British Columbia (CA), V5Z 3W3

( * ) Notice: Subject to any disclaimer, the term of this patent is extended or adjusted under 35 U.S.C. 154(b) by 0 days.

(21) Appl. No.: 09/312,584

(22) Filed: May 14, 1999

(51) Int. Cl.$^7$ .................................................. B65G 27/32
(52) U.S. Cl. .......................................... 198/761; 198/768
(58) Field of Search .................................. 198/759, 761, 198/763, 768

(56) References Cited

U.S. PATENT DOCUMENTS

| | | | |
|---|---|---|---|
| 3,668,939 | 6/1972 | Schrader | 74/61 |
| 3,712,459 | 1/1973 | Musschoot et al. | 198/220 |
| 3,789,977 | 2/1974 | Musschoot | 198/220 BC |
| 3,807,931 | 4/1974 | Wood et al. | 425/449 |
| 3,996,032 | 12/1976 | McWilliams et al. | 65/3 |
| 4,004,794 | 1/1977 | Jarret et al. | 267/153 |
| 4,024,288 | 5/1977 | Witte | 426/461 |
| 4,024,647 | 5/1977 | Schaefer | 34/12 |
| 4,074,474 | 2/1978 | Cristy | 52/2 |
| 4,088,223 | 5/1978 | Bertrand | 198/761 |
| 4,128,161 | 12/1978 | Yonkers | 198/761 |
| 4,192,419 | 3/1980 | Brodin | 198/750 |
| 4,194,611 | 3/1980 | Mukhin et al. | 193/2 B |
| 4,215,488 | 8/1980 | Donabedian | 34/238 |
| 4,237,622 | 12/1978 | Francis | 34/147 |
| 4,256,014 | 3/1981 | Kroger | 91/216 |
| 4,260,051 | 4/1981 | Burghart | 198/760 |
| 4,267,919 | 5/1981 | Schrader | 198/756 |
| 4,428,476 | 1/1984 | Kraus et al. | 198/764 |
| 4,496,884 | 1/1985 | Hamer et al. | 318/114 |
| 4,505,380 | 3/1985 | McLemore et al. | 198/750 |
| 4,514,942 | 5/1985 | Pocanschi | 52/167 |
| 4,548,623 | 10/1985 | Naske | 55/233 |
| 4,593,603 | 6/1986 | Johnson | 91/265 |
| 4,635,764 | 1/1987 | Woyski et al. | 188/268 |
| 4,744,714 | 5/1988 | Cross, Jr. et al. | 414/304 |
| 4,775,284 | 10/1988 | Musschoot | 198/550.01 |
| 4,779,523 | 10/1988 | Hiroshima | 99/404 |
| 4,781,403 | 11/1988 | Durnil | 285/94 |
| 4,839,031 | 6/1998 | Ackermann et al. | 209/2 |
| 4,858,749 | 8/1989 | Musschoot | 198/756 |
| 4,859,070 | 8/1989 | Musschoot | 366/114 |

(List continued on next page.)

FOREIGN PATENT DOCUMENTS

| | | |
|---|---|---|
| 1128453 | 4/1980 | (CA) . |
| 1192988 | 7/1982 | (CA) . |
| 1233427 | 3/1985 | (CA) . |
| 1296291 | 7/1986 | (CA) . |
| 1240918 | 8/1988 | (CA) . |
| 1255631 | 6/1989 | (CA) . |
| 1273319 | 8/1990 | (CA) . |
| 2032886 | 6/1991 | (CA) . |
| 2228452 | 7/1996 | (CA) . |
| 578-238 | 10/1977 | (SU) . |
| 2836-755 | 3/1979 | (SU) . |
| 772-946 | 10/1980 | (SU) . |

Primary Examiner—Joseph E. Valenza
(74) Attorney, Agent, or Firm—Kolisch Hartwell Dickinson McCormack & Heuser

(57) ABSTRACT

A vibratory conveyor capable of fluidizing particulate material is capable of separate control of direction, velocity and fluidization of material. The material is placed on a conveyor and vibrated by separate vertical and horizontal components of vibration. The frequency of both components is synchronized over an operating range. Various independent changes in amplitudes can affect the degree of fluidization and flow direction for any particular frequency. For any combination of amplitudes, changes in frequency affect fluidization and velocity. The present invention is adaptable for a range of applications that include drying wood wafers, hog fuel or other organic particulate, warming wood chips, scrubbing flue gas, filtering acting as a reactor and as a gas processor.

12 Claims, 4 Drawing Sheets

U.S. PATENT DOCUMENTS

| | | | |
|---|---|---|---|
| 4,875,343 | 10/1989 | Jeppsson | 62/381 |
| 4,909,379 | 3/1990 | Albeck et al. | 198/769 |
| 4,921,090 | 5/1990 | Gregor | 198/761 |
| 4,944,381 | 7/1990 | Riley | 198/370 |
| 4,948,321 | 8/1990 | Wilding et al. | 414/288 |
| 5,067,431 | 11/1991 | Heitmiller | 118/57 |
| 5,074,403 | 12/1991 | Myhre | 198/751 |
| 5,127,622 | 7/1992 | Whelpley et al. | 248/550 |
| 5,161,548 | 11/1992 | Neville | 131/296 |
| 5,178,259 | 1/1993 | Musschoot | 198/753 |
| 5,205,395 | 4/1993 | Bruno et al. | 198/389 |
| 5,211,277 | 5/1993 | Mount | 198/358 |
| 5,374,025 | 12/1994 | Whelpley et al. | 248/550 |
| 5,392,898 | 2/1995 | Burgess et al. | 198/750 |
| 5,404,996 | 4/1995 | Durnil | 198/761 |
| 5,409,101 | 4/1995 | Ahmed et al. | 198/750 |
| 5,472,079 | 12/1995 | Yagi et al. | 198/162 |
| 5,549,270 | 8/1996 | Platus et al. | 248/619 |
| 5,626,016 | 5/1997 | Walter | 60/532 |
| 5,653,044 | 8/1997 | Thom, Jr. | 34/217 |
| 5,816,386 | 10/1998 | Carlyle | 198/768 |
| 6,035,543 * | 3/2000 | Carlyle . | |

* cited by examiner

SYNCHRONIZED VIBRATOR CONVEYOR

BACKGROUND OF THE INVENTION

The present invention relates to a vibratory conveyor capable of fluidizing particulate material and more specifically to a conveyor that allows variations in the degree of fluidization of a particulate material on a vibratory conveyor together with independent variations in the speed and direction of the material on the conveyor.

Shaker or vibratory conveyors are commonly used for transporting particulate material and may be used for drying particulate material. When used for drying, the degree of fluidization of the material is important to allow drying gas to pass through there or circulate around. Such conveyors invariably have troughs or pans, which may or may not be perforated dependent upon their use. In existing perforated trough conveyors used for drying, the degree of fluidization is dependent at least partly on the gas flow and the retention time of the particulate material being conveyed is dependent upon the speed the material moves in the trough together with the length of the trough.

The invention is the owner or co-owner of the following patents related to the present invention:

U.S. Pat. No. 4,548,623 and Canadian Patent No. 1240918 entitled Perforated Trough Conditioning Device U.S. Pat. No. 5,816,386 entitled Fluidizer Conveyor Applicant is also the owner of the U.S. Pat. No. 6,035,543, issued, Mar. 14, 2000, and now U.S. Pat. No. 6,035,543.

Fluidizer conveyors have troughs that are vibrated by mechanical, electrical, pneumatic or hydraulic devices. These include hinged rocker arms, eccentrically loaded wheels, pulsating magnets or pneumatic or hydraulic cylinders.

A review of other available designs for fluidizing with vibrations reveals a fixed relationship between the vertical component for fluidization and the horizontal component for material velocity in the conveyor trough. Typical equipment includes eccentrically weighted motors for conveyor troughs, supported by inclined struts or springs which are caused to rapidly reciprocate horizontally. The vertical and horizontal components of the vibration forces are a function of the sine and cosine of the angle of the supporting strut or spring, or the angle of the axis of the eccentric motor.

Eccentrically weighted motors are used on large helical feeders where control of material velocity is the only requirement. Such motors cannot be too large otherwise the vibration forces produced may become destructive. These vibration forces act in a plane of rotation of 360° whereas the useful vertical forces needed are substantially in a single vertical plane. Thus, there are unproductive vibration forces that if excessive cause damage to the structure. Some designs overcome these problems by providing pairs of eccentric weights phased to offset the horizontal forces.

SUMMARY OF THE INVENTION

To address the above described shortcomings of the prior art, the vibrator conveyor of the present invention has been developed which separates the vibratory forces of fluidization and the vibratory forces that act to convey the particulate material in a conveyor trough or tray. The forces may act separately or in combination. The apparatus of the present invention applies the fluidizing forces in a generally vertical direction and the conveying forces in a generally horizontal direction.

Accordingly, the present invention provides a fluidizer conveyor mountable to a base comprising:

a trough to hold, fluidize and convey particulate material;

at least one reciprocating hydraulic vector cylinder connected between the trough and the base to impart a vibratory motion to the trough to convey material along the trough;

at least one reciprocating hydraulic thrust cylinder connected between the trough and the base to impart a vibratory motion to the trough to fluidize material in the trough;

first control means for the at least one thrust and vector hydraulic cylinders to independently control the amplitude of vibration of each cylinder; and second control means for the at least one thrust and vector hydraulic cylinders to synchronously control the frequency of vibration of the cylinders;

whereby the first and second control means control movement of the at least one thrust and vector hydraulic cylinders such that the cylinders co-operate to impart a desired vibration motion to the trough at a resultant vector angle.

The frequency of vibration of the vector and thrust cylinders can be synchronized to be in phase or 180 degrees out of phase over frequencies generally in the range 700 to 1500 cycles per minute (cpm). The amplitudes of vibration are independently controlled generally in the range of 0.010 to 0.060 inches.

The present invention uses synchronized frequencies for the horizontal or "Vector" cylinders and the vertical or "Thrust" cylinders. The amplitude applied to the vector cylinders is separately controlled from the amplitude applied to the thrust cylinders. The resultant vector angle of vibration on the trough determines the velocity of material travel in the trough. The vector angle in the plane of vibration is a function of the amplitudes applied to the vector and thrust cylinders. Equal amplitudes will produce a 45-degree vector angle for any frequency applied by the cylinders. If the thrust cylinder amplitude is greater than the vector cylinder amplitude the resultant vector angle will be greater than 45 degrees. Conversely, if the thrust cylinder amplitude is less than the vector cylinder amplitude the resultant vector angle will be less than 45 degrees.

The velocity of material for any vector angle is a function of the vibration frequency and the set amplitudes applied to both cylinders. Velocity will increase or decrease with an increase or decrease in frequency for the set amplitudes. The degree of fluidization is a function of the amplitude of the thrust cylinders. An increase in amplitude will increase fluidization and vice versa. For any set synchronized frequency the velocity of material will increase or decrease as the amplitude of the vector cylinder increases or decreases.

When the vector cylinder frequency lags the thrust cylinder frequency by 180 degrees the direction of material flow will be reversed from the flow direction in the trough. By utilizing variable thrust amplitudes through a range of frequencies one can select the degree of fluidization for any velocity and direction.

When this invention is used for drying particulate material, the conveyor trough may be designed to allow the drying medium, or gas, to pass up through openings in the tray and through the bed of particulate. Fluidization of the particulate with vibrations will allow the gas to flow around each particulate to increase the rate of mass transfer and reduce retention. Fluidization is also discussed in more detail in applicant's U.S. Pat. No. 5,816,386 entitled Fluidizer Conveyor, the contents of which are incorporated herein by reference.

BRIEF DESCRIPTION OF DRAWINGS

Aspects of the invention are illustrated, merely by way of example, in the accompanying drawings in which.

DESCRIPTION OF THE PREFERRED EMBODIMENTS

Figure 1:
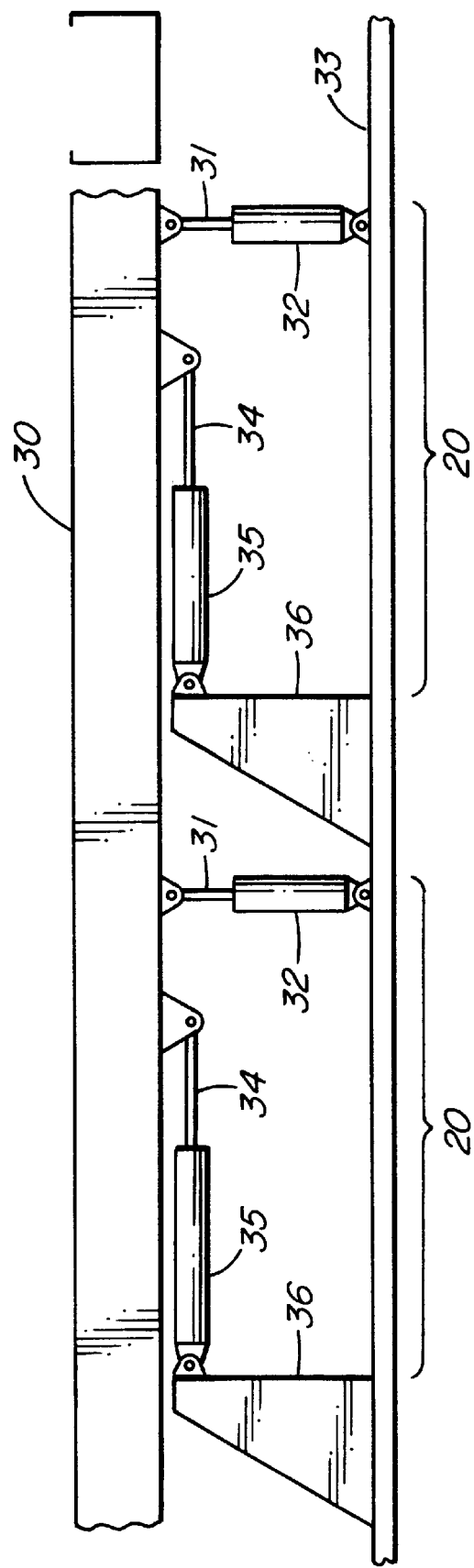
FIG. 1 is a side elevation view of the first embodiment of the present invention for use with a straight conveyor trough.

A straight fluidizer conveyor according to a first embodiment of the present invention is shown in FIG. 1 with the conveyor trough (30) supported and vibrated vertically by means of vertical thrust cylinder rods (31) and cylinders (32). Cylinders 32 are supported by means of a base (33). Horizontal vector cylinders (35) and cylinder rods (34) vibrate the conveyor trough horizontally with the base of the cylinder (35) supported by means of base brackets (36) extending from base (33). The assembly may be operated as a level or inclined conveyor. In each case, vector cylinders (35) and thrust cylinders (32) are arranged in pairs to define a vibration group (20) to apply appropriate fluidization and conveying vibrations to trough (30).

A single vibration group (20) may be used or alternatively, a plurality of groups may be used depending on the length of the conveyor trough (30). The vibration groups (20) are supported on a heavy base (33) to confine the vibrations to trough (30).

The frequency of vibration of the vector and thrust cylinders (35, 32) can be synchronized to be in phase or 180 degrees out of phase. Preferably, the frequencies are generally in the range 700 to 1500 cycles per minute (cpm). The amplitudes of vibration are independently controlled generally in the range of 0.010 to 0.060 inches. It has been found that these vibration parameters provide adequate fluidization and velocity for particulate matter in the conveyor trough.

The amplitude applied to the vector cylinders is separately controlled from the amplitude applied to the thrust cylinders. The resultant vector angle of vibration on the trough determines the velocity of material travelling in the trough. The vector angle in trough (30) is a function of the amplitudes applied to the vector and thrust cylinders. For example, equal amplitudes of vibration applied to the cylinders (32, 35) will produce a 45-degree vector angle with respect to the plane of the trough for any frequency applied to the cylinders. If the thrust cylinder amplitude is greater than the vector cylinder amplitude the resultant vector angle will be greater than 45 degrees measured from the plane of trough (30). Conversely, if the thrust cylinder amplitude is less than the vector cylinder amplitude the resultant vector angle will be less than 45 degrees.

Arrangement of the vibration cylinders (32,35) in paired vibration groups (20) permits the apparatus of the present invention to be operated to change the direction of flow of the transported material. When the vector cylinder (35) frequency lags the thrust cylinder (32) frequency by 180 degrees, the direction of material flow will be reversed from the flow direction when the cylinders are synchronized in phase with each other. By using variable thrust amplitudes through a range of frequencies one can select the degree of fluidization for any velocity and direction.

Figure 2:
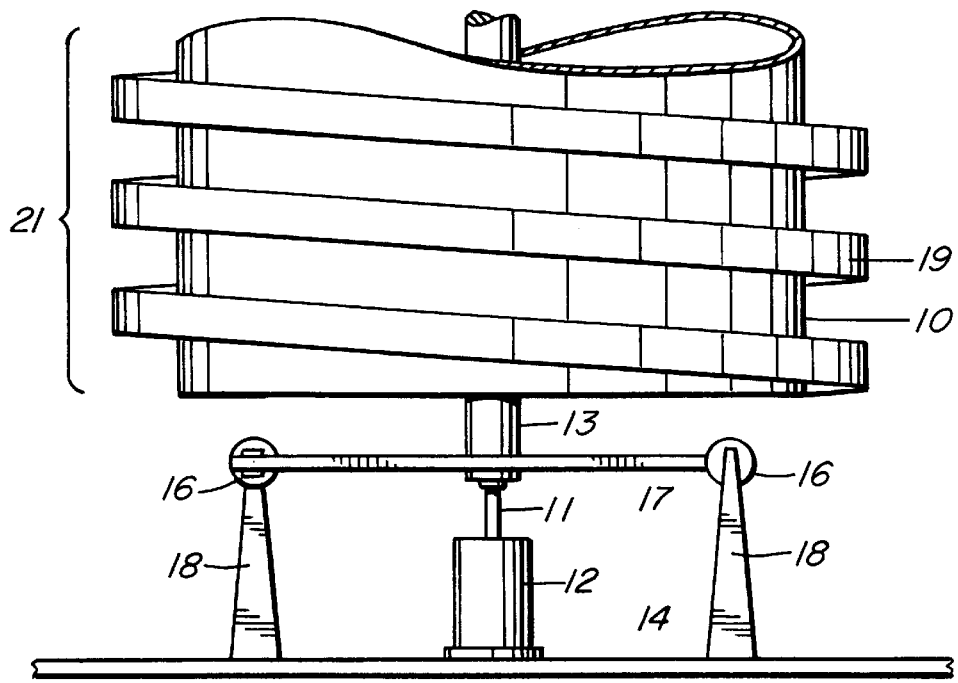
FIG. 2 is a side elevation view of a second embodiment of the present invention for use with a helical conveyor trough assembly.

A second embodiment of the invention is illustrated in FIG. 2 incorporating a helical conveyor assembly (21). In this arrangement, conveyor trough (19) is defines a helical path that is rigidly connected to the exterior surface of a vertical cylinder shell (10). A vertical thrust cylinder (12) with rod (11) acts on the lower end of shaft (13) extending along the polar axis of the shell. Cylinder (12) is supported by means of the machine base (14). Two horizontal vector cylinders (16) are provided to impart the required conveying vibratory motion. Vector cylinders (16) are mounted to extend between supports (18), fastened to the machine base (14), and the moment arm (17). Moment arm (17) comprises an elongate arm that extends shaft (13).

Figure 3:
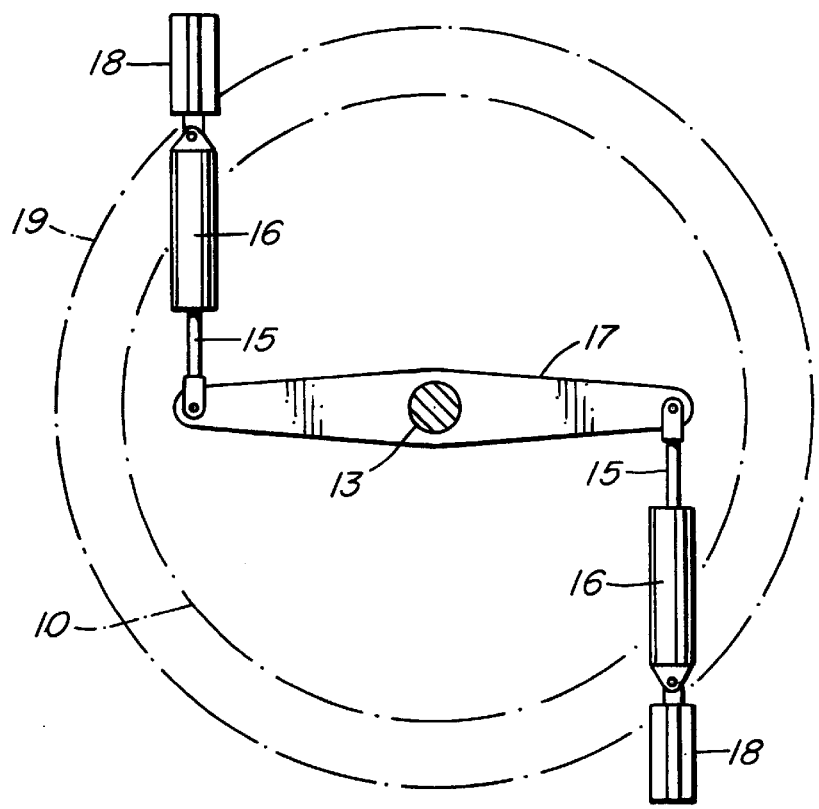
FIG. 3 is a plan view of the horizontal and vertical cylinder arrangement of FIG. 2.

A plan view of the horizontal vector cylinder (16) arrangement of FIG. 2 is shown in FIG. 3. The moment arm (17) is rigidly attached to shaft (13). Horizontal vibrations are induced in the assembly by means of the horizontal vibrating cylinders (16) acting on the moment arm (17) to produce torsional vibrations.

Figure 4:
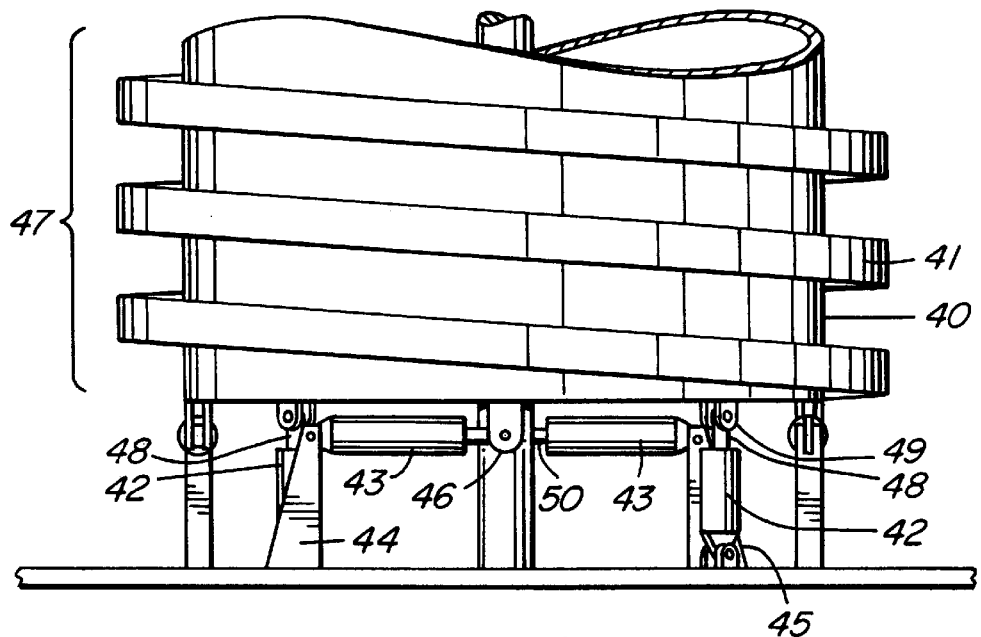
FIG. 4 is a side elevation view of a third embodiment of the present invention for a helical conveyor assembly.

A third embodiment of the present invention is shown in FIG. 4 which also incorporates a helical conveyor assembly (47). In this arrangement, the horizontal (43) and vertical (42) vibrating cylinders are located between the lower end of the cylindrical shell (40) and the base plate (45). Vertical vibrations are provided by means of vertical cylinders (42) and associated cylinder rods (48). Rods (48) are connected to the lower end of shell (40) by a bracket (49) and cylinder (42) is pivotally mounted to base plate (45). Horizontal vibrations are induced in the helical conveyor assembly (47) by horizontal vibrating cylinders (43) and associated cylinder rods (50). Rods (50) are connected to a bracket (46) mounted to the lower end of shell (40). The horizontal vibrating cylinders (43) are supported by brackets (44) extending upwardly from base (45).

Figure 5:
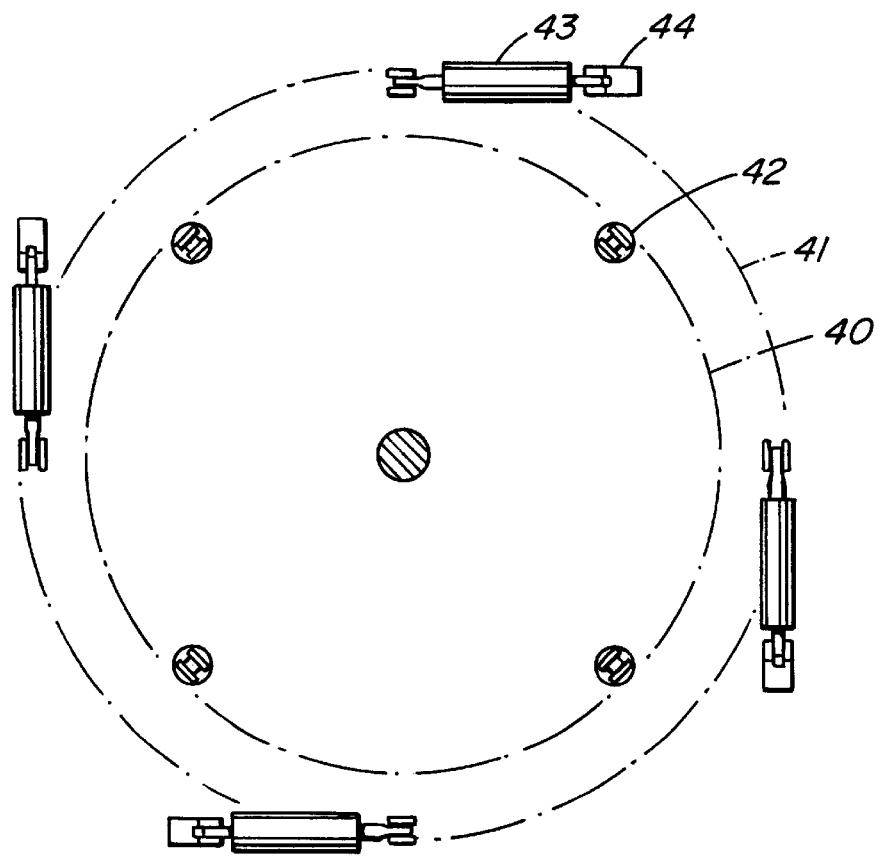
FIG. 5 is a plan view of FIG. 4 showing the arrangement of the horizontal and vertical cylinders.

A plan view of the FIG. 4 arrangement is shown in FIG. 5 to provide a detail view of the arrangement of the four vertical thrust cylinders (42) and the four horizontal vector cylinders (43). Vector cylinders (43) are mounted to lower edge of shell (40) to exert a generally tangential force to the lower end of the shell (40). The mounting points of the vertical (42) and horizontal vector cylinders (43) are preferably spaced 45° apart in an alternating configuration around the lower end of the cylinder as illustrated. Alternatively, pairs of vertical and horizontal cylinders can be attached to the lower end of shell (40) by means of common mounting locations 90° apart.

In both of the helical conveyor arrangements of FIGS. 2 and 4, the vertical thrust cylinders are arranged to provide vibratory motion to fluidize the material on the conveyor path. The horizontal vector cylinders are positioned to create vibratory motion to transport material along the conveyor. The amplitude of the vector and thrust cylinders can be varied to determine the resultant vector angle of vibration on the trough determines the velocity of material travelling along the helical conveyor path. The frequency of vibration of the vector cylinders can be adjusted to establish the direction of movement along the conveyor path. If the frequency of the vector and thrust cylinders are in phase the motion will be in one direction. If the frequency the vector and thrust cylinders are 180 degrees out of phase, then the motion of material along the conveyor will be in the opposite direction.

Figure 6:
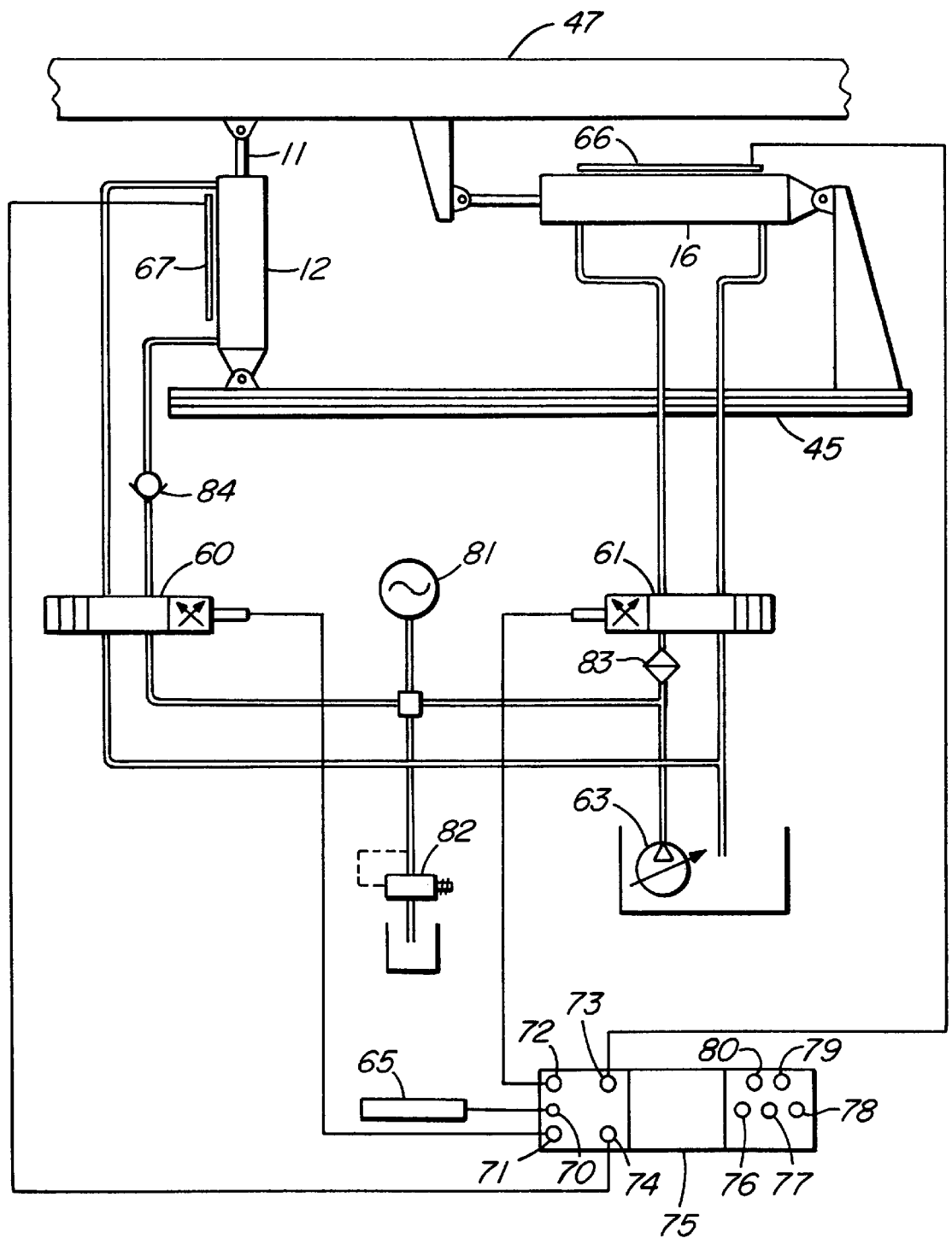
FIG. 6 is a schematic drawing showing the arrangement of the hydraulic and electric circuits.

FIG. 6 shows a schematic diagram of the hydraulic and electric PLC control system for a single pair of vertical "thrust" and horizontal "vector" cylinders. A proportional valve (60) is connected to the vertical "thrust" cylinder (12) and a compensating pump (63). A second proportional valve (61) is connected to the horizontal "vector" cylinder (16) and a compensating pump (63). The proportional valves (60) and (61) are operated at a synchronized frequency by means of an inverter (65) connected to terminal (70) of a PLC.

The amplitude of the "thrust" cylinder (12) is controlled by means of the proportional valve (60), which is connected to a PLC terminal (71). The amplitude of the "vector" cylinder (16) is controlled by means of the proportional valve (61), which is connected to a PLC terminal (72).

The position, frequency and amplitude of the "thrust" cylinder (12) is sensed by means of a linear position transducer (67) connected to a PLC terminal (74). The position, frequency and amplitude of the "vector" cylinder (16) is sensed by means of a linear position transducer (66) connected to a PLC terminal (73).

An operator interface (75) provides integrated control of frequency, amplitude and cylinder positions. The frequency output of inverter (65) is set by means of control (80). The position of the "thrust" cylinder (12) is set on the linear position transducer by means of control (76). The position of the "vector" cylinder (16) is set on the linear position transducer by means of control (77).

The amplitude of the "thrust" cylinder (12) is set by means of control (78). The amplitude of the "vector" cylinder (16) is set by means of control (79).

Accumulator (81), solenoid unloading relief valve (82) to unload shut down of the system, filter (83), and solenoid pilot operated check valve (84) to support a shut down load are provided to ensure reliable operation of the system on startup and shutdown.

This invention may also be used for chemical reactions when the reactant gas is passed through fluidized bed of subject material. Time for chemical reaction may be increased or decreased by changes in temperature, fluidization and retention.

Various changes may be made to the embodiments shown herein without departing from the scope of the present invention which is limited by the following claims.

I claim:

1. A fluidizer conveyor mountable to a base comprising:

a trough to hold, fluidize, and convey particulate material;

at least one reciprocating vector cylinder mounted substantially parallel to the trough and connected between the trough and the base to impart a vibratory motion to the trough to convey material along the trough;

at least one reciprocating thrust cylinder mounted transversely to the trough and connected between the trough and the base to impart a vibratory motion to the trough to fluidize material in the trough;

first control means for the at least one thrust and vector cylinders to independently control the amplitude of vibration of each cylinder; and second control means for the at least one thrust and vector cylinders to synchronously control the frequency of vibration of the cylinders;

whereby the first and second control means control movement of the at least one thrust and vector cylinders such that the cylinders co-operate to impart a desired vibration motion to the trough at a resultant vector angle.

2. A fluidizer conveyor as claimed in claim 1 in which the frequency of vibration of the at least one thrust cylinder and the at least one vector cylinder is controlled such that the cylinders are in phase with each other.

3. A fluidizer conveyor as claimed in claim 1 in which the frequency of vibration of the at least one thrust cylinder and the at least one vector cylinder is controlled such that the cylinders are 180 degrees out of phase with each other.

4. A fluidizer conveyor according to claim 1 in which there are a plurality of thrust and vector cylinders arranged in pairs and spaced along the centre line of the linear trough.

5. A fluidizer conveyor as claimed in claim 1 in which the thrust and vector cylinders are double acting and each of the first and second control means includes a proportional valve and an inverter.

6. A fluidizer conveyor as claimed in claim 1 wherein the trough has a helical configuration which is centrally guided on a vertical axis and vibrated by at least one thrust hydraulic cylinder positioned to impart a vibratory motion along the vertical axis and at least one vector hydraulic cylinder positioned to impart a vibratory motion about the central axis to cause rotation of the axis.

7. A fluidizer conveyor as claimed in claim 6 in which the at least one thrust hydraulic cylinder comprises a generally vertical cylinder aligned with the vertical axis.

8. A fluidizer conveyor as claimed in claim 6 in which an arm extends transverse to the central axis having two opposed ends, and the at least one vector hydraulic cylinder comprises a pair of generally horizontal cylinders, each cylinder extending between the base and one of the ends of the arm.

9. A fluidizer conveyor as claimed in claim 6 in which the trough is mounted to a base plate and the at least one thrust hydraulic cylinder comprises a plurality of generally vertical cylinders extending between the base and the base plate.

10. A fluidizer conveyor as claimed in claim 6 in which the trough is mounted to a base plate and the at least one vector hydraulic cylinder comprises a plurality of generally horizontal cylinders extending between the base plate and a support extending from the base.

11. The fluidizer conveyor according to claim 1 wherein the first control means provides a variation of the amplitude of vibration from about 0.010 inches to 0.060 inches.

12. The fluidizer conveyor according to claim 1 wherein the second control means provides a variation of the synchronized frequency of vibration from about 700 to 1500 cycles per minute.

* * * * *